United States Patent
Burkes et al.

(10) Patent No.: US 8,264,710 B2
(45) Date of Patent: Sep. 11, 2012

(54) PRINTING PREPARATION

(75) Inventors: Theresa A. Burkes, Meridian, ID (US);
James H. Bigelow, Seattle, WA (US);
Chris R. Gunning, Boise, ID (US); Lisa Johnson, Boise, ID (US); Raymond S. Kennedy, Nampa, ID (US); Scott W. Ahistrom, Boise, ID (US); Michael Tang, Boise, ID (US); Sidney R. Reed, Boise, ID (US); Douglas J. Mellor, Meridian, ID (US); Brian L. Watts, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1504 days.

(21) Appl. No.: 10/385,401

(22) Filed: Mar. 10, 2003

(65) Prior Publication Data

US 2004/0179227 A1  Sep. 16, 2004

(51) Int. Cl.
*G06F 15/00* (2006.01)
(52) U.S. Cl. ............. 358/1.15; 358/1.13; 358/1.14; 358/1.16; 358/1.17; 358/1.18; 358/448
(58) Field of Classification Search ............. 358/1.15, 358/1.17, 448
See application file for complete search history.

(56) References Cited

U.S. PATENT DOCUMENTS

| | | | | |
|---|---|---|---|---|
| 5,600,762 A * | 2/1997 | Salgado et al. | ............. | 358/1.15 |
| 5,668,938 A * | 9/1997 | Tomory | ............. | 358/1.16 |
| 5,764,866 A * | 6/1998 | Maniwa | ............. | 358/1.15 |
| 5,801,837 A * | 9/1998 | Hamanaka et al. | ............. | 358/296 |
| 5,913,018 A * | 6/1999 | Sela | ............. | 358/1.17 |
| 6,018,400 A * | 1/2000 | Blair | ............. | 358/1.9 |
| 6,031,624 A * | 2/2000 | Murphy | ............. | 358/1.17 |
| 6,069,707 A * | 5/2000 | Pekelman | ............. | 358/1.6 |
| 6,094,546 A * | 7/2000 | Nakazato et al. | ............. | 399/1 |
| 6,347,852 B1 * | 2/2002 | Chen | ............. | 347/5 |
| 6,493,100 B1 * | 12/2002 | Endo et al. | ............. | 358/1.14 |
| 6,542,253 B1 * | 4/2003 | Kim | ............. | 358/1.15 |
| 6,563,598 B1 * | 5/2003 | Johnson et al. | ............. | 358/1.15 |
| 6,738,150 B1 * | 5/2004 | Claiborne et al. | ............. | 358/1.11 |
| 6,785,727 B1 * | 8/2004 | Yamazaki | ............. | 709/229 |
| 7,187,460 B2 * | 3/2007 | Able et al. | ............. | 358/1.14 |
| 7,212,303 B2 | 5/2007 | Iida | | |
| 2002/0044300 A1 * | 4/2002 | Oyanagi | ............. | 358/1.15 |
| 2002/0105676 A1 * | 8/2002 | Fujiwara et al. | ............. | 358/1.15 |

(Continued)

FOREIGN PATENT DOCUMENTS

JP    08030165 A   *   2/1996

OTHER PUBLICATIONS

U.S. Appl. No. 10/385,382, filed Mar. 10, 2003, inventors Theresa A. Burkes et al., entitled "Accelerating Printing."

(Continued)

*Primary Examiner* — Benny Q Tieu
*Assistant Examiner* — Pawandeep Dhingra

(57) ABSTRACT

In an exemplary device implementation, the device includes: a scanner capable of scanning a scanning target to produce an electronic image of the scanning target; and a printer capable of printing an image of the scanning target on a media, the printer including a print engine; wherein the device is adapted to overlap the scanning of the scanning target with preparation of the print engine for printing.

25 Claims, 5 Drawing Sheets

U.S. PATENT DOCUMENTS

| | | | |
|---|---|---|---|
| 2002/0118387 A1* | 8/2002 | Patton | 358/1.15 |
| 2002/0186397 A1* | 12/2002 | Ito | 358/1.14 |
| 2003/0025938 A1* | 2/2003 | Iida | 358/1.15 |
| 2003/0048492 A1* | 3/2003 | Maeda et al. | 358/486 |
| 2003/0081253 A1* | 5/2003 | Sekiguchi et al. | 358/1.16 |
| 2004/0125385 A1* | 7/2004 | Mellor et al. | 358/1.1 |
| 2004/0141201 A1* | 7/2004 | Shima | 358/1.15 |

OTHER PUBLICATIONS

U.S. Appl. No. 10/385,393, filed Mar. 10, 2003, inventors Theresa A. Burkes et al., entitled "Page Processing and Print Engine Management,"

* cited by examiner

PRINTING PREPARATION

BACKGROUND

Multifunction devices in modern office environments or other document management/production environments are used to perform functions that often previously used multiple separate devices. These functions can include printing, copying, scanning, faxing, electronic document transmission by other means, and so forth.

Copying functions, in effect, can be accomplished by combining scanning and printing functions. Consequently, the type of print engine used for the printing function can affect various characteristics of the copying function. One print engine type that is used for the printing function is a laser printer. With laser printers, a period of time is consumed while making the print engine ready for printing. However, the print engine maintaining a ready state indefinitely causes wear and tear.

In a copying operation using a scanner and a laser printer, a tradeoff may exist between the time used to complete the copying operation and the incremental wear and tear experienced by the laser printer as a result of the copying operation. For example, steps taken to reduce the incremental wear and tear experienced by the laser printer to perform a copying operation may lengthen the time used to perform the copying operation.

SUMMARY

In an exemplary device implementation, the device includes: a scanner capable of scanning a scanning target to produce an electronic image of the scanning target; and a printer capable of printing an image of the scanning target on a media, the printer including a print engine; wherein the device is adapted to overlap the scanning of the scanning target with preparation of the print engine for printing.

BRIEF DESCRIPTION OF THE DRAWINGS

In the Drawings, like numerals are used for like and/or corresponding features, aspects, and components of the various FIGS. 1-7.

DETAILED DESCRIPTION

Figure 1:
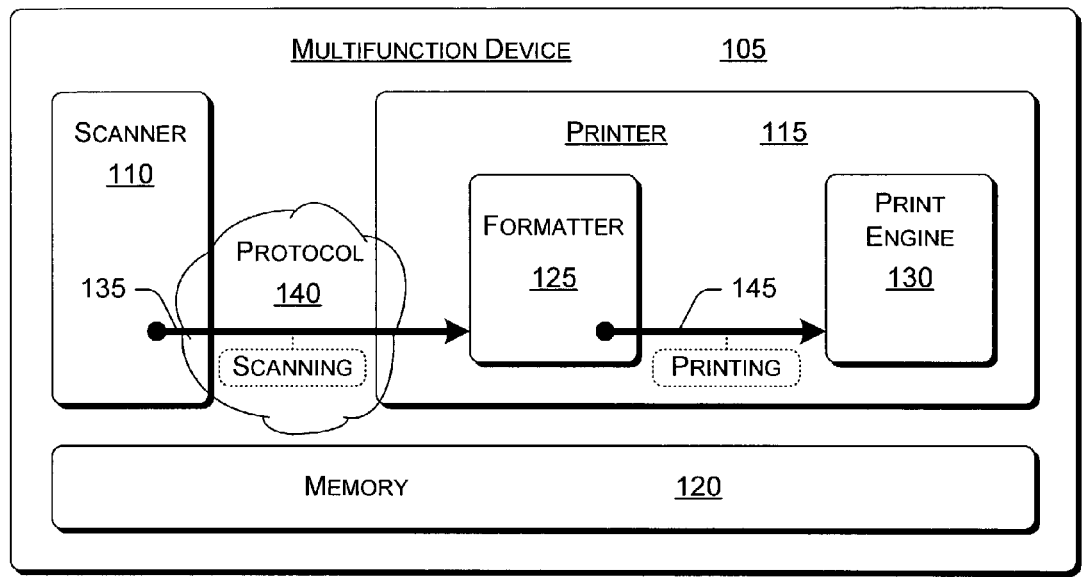
FIG. 1 is an exemplary multifunction device that includes a scanner and a printer and that is capable of performing a copying function.

FIG. 1 is an exemplary multifunction device 105 that includes a scanner 110 and a printer 115 and that is capable of performing a copying function. Multifunction device 105 also includes a memory 120, and printer 115 includes a formatter 125 and a print engine 130. In a described implementation, scanner 110 is capable of scanning in a physical document (not shown in FIG. 1) and creating an electronic image thereof. Scanner 110 is adapted to provide scanning information 135 to formatter 125 using protocol 140. Scanning information 135 may include all or part of the electronic image of the scanned document, a time remaining prediction regarding the time to complete the scan, both of these, and so forth.

Formatter 125 receives scanning information 135 and analyzes/processes it to produce printing information 145, which is provided to print engine 130. Printing information 145 may include all or part of the printable strips of the electronic image of the scanned document, an instruction to set or change a state of print engine 130, both of these, and so forth. Because the remaining time to complete a scan is predictable after a first scan strip of a target document is completed, printer 115 can better manage print engine 130, and states thereof, under the control and/or guidance of formatter 125.

Generally, formatter 125 can cause print engine 130 to begin preparing for printing prior to the complete scanning of the target document by scanner 110 and/or while formatter 125 is processing scanning information 135. Specifically, if the time remaining for scanner 110 to complete the entire scanning (and/or for formatter 125 to complete scan information processing) is less than or equal to the time to prepare print engine 130 to be ready to print, then formatter 125 causes print engine 130 to begin preparing for printing by so notifying print engine 130 (e.g., by sending an initialize instruction as printing information 145).

Multifunction device 105 is capable of performing two or more functions such as printing, copying, scanning, faxing, electronic document transmission by other means, and so forth. Hence, in addition to one or more scanners 110 and one or more printers 115, multifunction device 105 may also include other components directed to faxing, network communication, and so forth. Scanner 110 and printer 115 may be considered as a scanning component (e.g., a scanning unit) and a printing component (e.g., a printing unit), respectively. Scanner 110 and printer 115 may be usable separately for scanning and printing and/or jointly as a copying component or components for copying.

Formatter 125 may be realized as hardware, software, firmware, or some combination thereof and as part of any component of multifunction device 105. However, formatter 125 is typically implemented as a formatting board that is part of printer 115. Memory 120 may be usable for only a single function of multifunction device 105, or it may be shared by multiple components and for multiple functions thereof.

Figure 2:
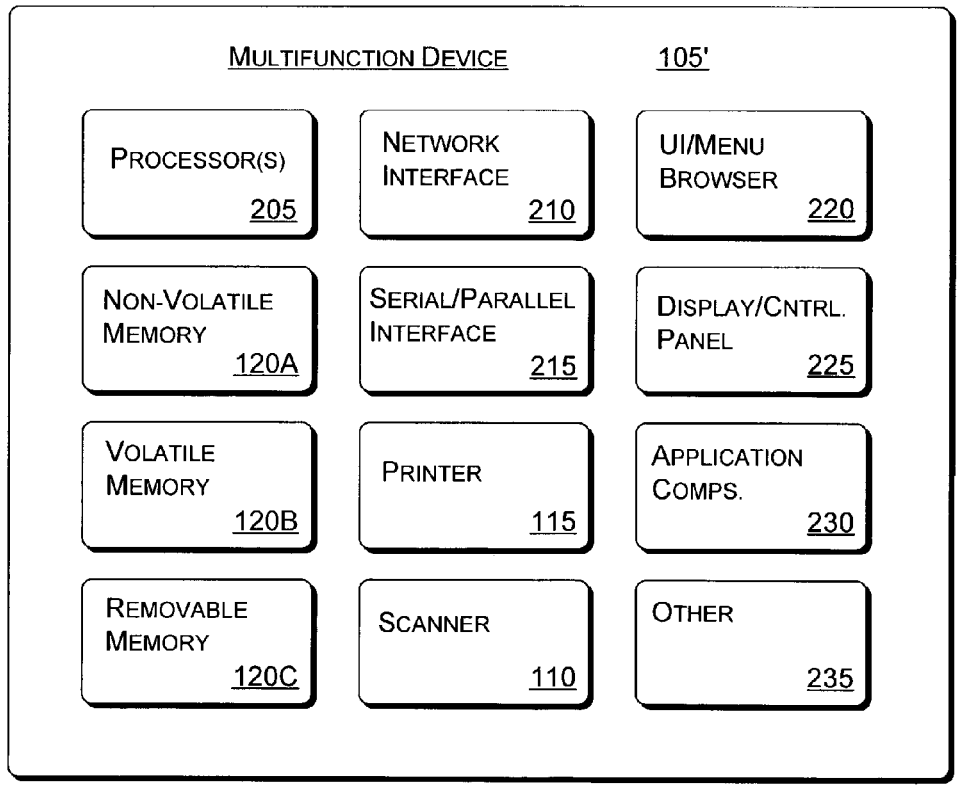
FIG. 2 is an implementation of a multifunction device that illustrates exemplary components thereof.

FIG. 2 is a multifunction device implementation 105' that illustrates exemplary components 110, 115, 120A-C, and 205-235. Any particular multifunction device implementation 105' need not include most, much less all, of the exemplary components 120A-C and 205-235. Nevertheless, in the described implementation of FIG. 2, multifunction device 105' includes one or more processors 205, non-volatile memory 120A, volatile memory 120B, and removable memory 120C. Processor(s) 205 process various instructions to control the operation of multifunction device 105' and to communicate with other electronic and/or computing devices. Memories 120A, 120B, and/or 120C may store these instructions, as well as other information and data such as that for scanning, copying, faxing, and printing.

Non-volatile memory 120A may include read-only (non-erasable) memory (ROM), flash memory, programmable read-only memory (PROM), electrically programmable read-only memory (EPROM), electrically erasable programmable read-only memory (EEPROM), some other non-volatile (e.g., solid state) memory, and so forth. Non-volatile memory 120A may also include a mass memory such as a disk-based storage system. Regardless, non-volatile memory 120A may store boot-level/initialization code, basic identification, information supportive of one or more functions of multifunction device 105', and/or alterable or unalterable operational information such as firmware, and so forth.

Volatile memory 120B is typically a random access memory (RAM). Volatile memory 120B holds information that is needed on a transient basis such as printing, faxing, copying, or scanning data; current processing instructions; electronic documents for current manipulation/transmission; and so forth. Removable memory 120C may include a floppy drive, a removable hard drive, a removable flash memory cartridge/module, a proprietary format (e.g., a ZIP® drive), and so forth. Removable memory 120C may hold document information, new or revised instructions/firmware, and so forth.

Multifunction device 105' also includes a network interface (e.g., adapter) 210, and a serial and/or parallel interface (e.g., adapter) 215. Network interface 210 may provide a connection between multifunction device 105' and a data communication network (or a specific device connected over a network-type medium). Network interface 210 allows devices coupled to a common data communication network to send print jobs, faxes, and other information to multifunction device 105' via the data communication network. Similarly, serial and/or parallel interface 215 may provide a data communication path directly between multifunction device 105' and another electronic and/or computing device. Multifunction device 105' may alternatively substitute or add another interface adapter type, such as a Universal Serial Bus (USB) interface adapter, an IEEE 1394 ("Firewire") interface adapter, a wireless interface (e.g., Bluetooth®, IEEE 802.11, wireless Local Area Network (LAN), etc.) adapter, and so forth.

Multifunction device 105' also includes printer 115 that typically includes one or more mechanisms arranged to selectively apply pigment (e.g., toner) to a print media such as paper, plastic, fabric, and the like in accordance with print data corresponding to a print job, including those print jobs arriving via scanner 110 (e.g., possibly to support a copying function as a copy job). For example, printer 115 may include a laser printing mechanism that selectively causes toner to be applied from toner container(s)/cartridge(s) to an intermediate surface of a drum or belt that spins. The intermediate surface can then be brought into the proximity of a print media in a manner that causes the toner to be transferred to the print media in a controlled fashion. The toner on the print media can then be more permanently fixed to the print media, for example, by selectively applying thermal energy to the toner. Alternatively, printer 115 may include an ink jet printing mechanism that selectively causes liquid ink to be extracted from ink container(s) and ejected through print head nozzles and onto print media to form an intended pattern (e.g., text, pictures, etc.).

Printer 115 may also be designed or configured to support duplex printing, for example, by selectively flipping or turning the print media as appropriate to print (including to copy) on both sides. There are many different types of printing units available, and printer 115 may be comprised of any one or more of these different types. Although not explicitly shown, a system bus or busses (or other communication links) may connect and interconnect the various illustrated components 110, 115, 120A-C, and 205-235 of multifunction device 105'. For example, a communication link exists between printer 115 and scanner 110 in order for scanner 110 to communicate scanning information 135 and optionally other information to printer 115.

Multifunction device 105' thus includes scanner 110 that can be implemented as an optical or other scanner to produce machine-readable/understandable image data signals that are representative of a scanning target, such as a photograph, a page of printed text, an object, and so forth. The image data signals produced by scanner 110 can be used to reproduce an image of the scanning target, such as on a computer monitor or print media (e.g., via printer 115).

Multifunction device 105' may also include a user interface (UI) and/or menu browser 220 and a display and/or control panel 225. The UI and/or menu browser 220 allows a user of multifunction device 105' to navigate the device's menu structure (if any). A display aspect of display and/or control panel 225 may be a graphical and/or textual display that provides information regarding, e.g., the status of multifunction device 105' and the current options available to a user through, e.g., a menu structure. Any such graphical and/or textual display may be realized using a liquid crystal display (LCD) screen, a cathode ray tube (CRT) screen, a plasma screen, a light emitting diode (LED) screen, a video screen, and so forth. A control aspect of display and/or control panel 225, on the other hand, may be composed of indicators and/or a series of buttons, switches, or other selectable controls that are manipulated by a user of multifunction device 105'.

Multifunction device 105' may, and typically does, include application components 230 that provide a runtime environment in which software applications or components can run or execute. There are many different types of available runtime environments, which facilitate the extensibility of multifunction device 105' by allowing various interfaces to be defined that, in turn, allow application components 230 to interact with multifunction device 105'. Other components, whether comprised of hardware, software, firmware, or some combination thereof, may also be part of multifunction device 105', as indicated by the other block 235.

Figure 3:
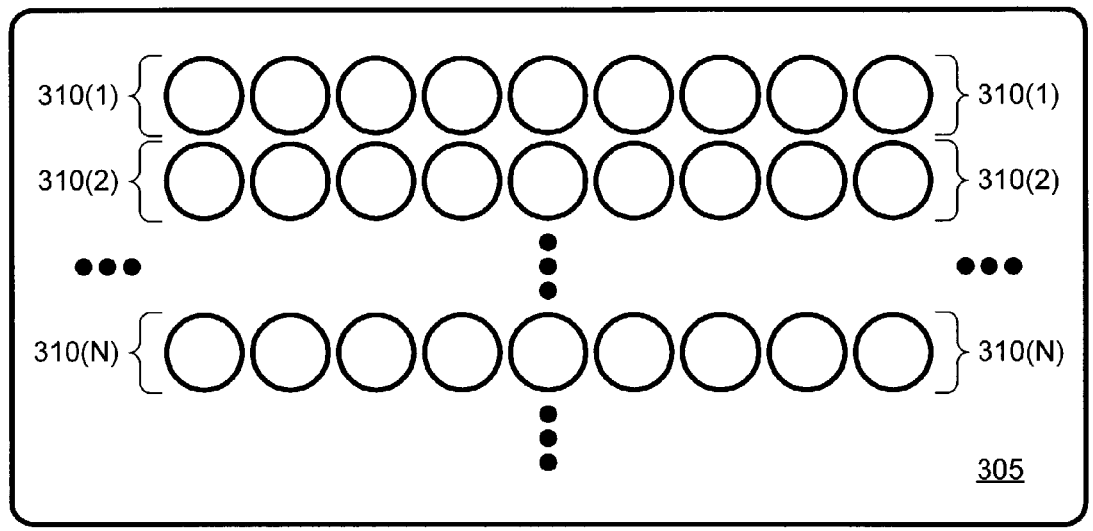
FIG. 3 illustrates an exemplary scanning target.

FIG. 3 illustrates an exemplary scanning target 305. Scanning target 305 may be any physical media such as paper, cloth, a three-dimensional object, and so forth. For example, scanning target 305 may comprise a document such as loose paper, a magazine, a book, and so forth. Scanners 110 typically scan one line at a time from the top of scanning target 305 to the bottom of scanning target 305. It should be noted that any side or portion of scanning target 305 may be defined as the top or bottom of scanning target 305.

Scanning target 305 includes indications of multiple scanning lines 310, from a first scan line 310(1), to a second scan line 310(2) ... to an nth scan line 310(N). Scan lines 310 may refer to a physical line of scanning target 310 and/or image data signals that are representative of a physical line of scanning target 310 as scanned in by scanner 110. In a described implementation, first scan line 310(1) is transmitted first to printer 115. However, scan lines 310 may be transferred to printer 115 in any order.

Figure 4:
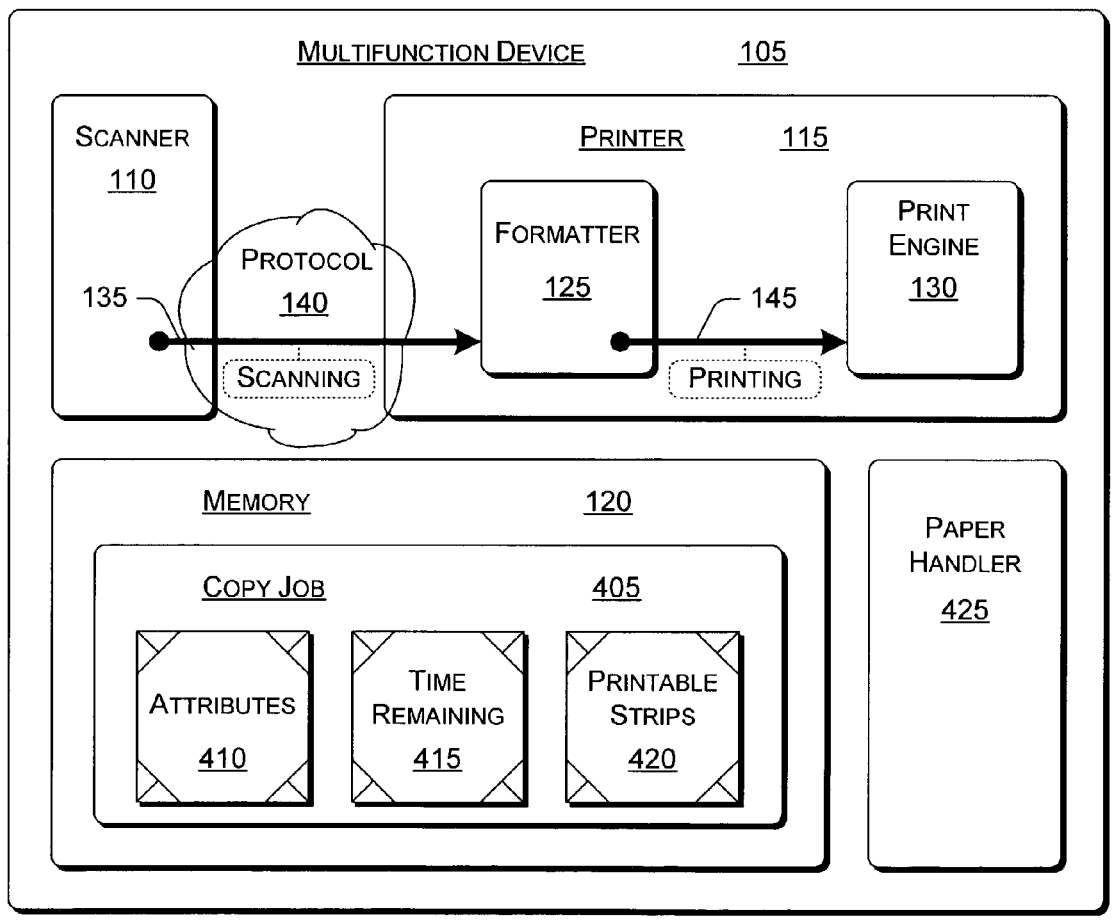
FIG. 4 illustrates an exemplary approach to accelerating copying with a multifunction device.

FIG. 4 illustrates an exemplary approach to accelerating copying with a multifunction device 105. In this exemplary approach, a copy job 405 is being worked on using scanner 110 and printer 115. Scanner 110 scans in scanning lines 310 of a scanning target 305. These scanning lines 310 are forwarded to formatter 125 using protocol 140. This protocol 140 may enable scanner 110 to provide a time remaining prediction for the completion of the scanning of scanning target 305. Such a time remaining prediction may be sent separately or along with one or more scanning lines 310, such as first scan line 310(1). Alternatively, formatter 125 may be capable of deriving a time remaining prediction from other scanning information 135. For example, formatter 125 may have specification information that enables it to derive a time remaining prediction based on the arrival of a first scan line 310(1) from scanner 110.

Formatter 125 controls and/or oversees print operations of printer 115, including those print operations that correspond to a copy job 405. Formatter 125 analyzes and processes scanning information 135 to produce printing information 145 for copy job 405. Copy job 405 is stored in memory 120 and managed by formatter 125. Copy job 405 includes one or more attributes 410, at least one time remaining (prediction) 415, printable strips 420, and so forth.

Attributes 410 may include both job attributes that pertain to the entire copy job 405 and page attributes that pertain primarily to individual pages of copy job 405. Attributes 410, for both the job and individual pages, are described further below with reference to FIG. 6.

Time remaining 415 may be an accurate prediction, and thus more than a mere estimate, because scanner 110 can usually execute a scanning function in an orderly and straightforward manner. Time remaining 415 is monitored by formatter 125 in order to manage the states of print engine 130, especially with respect to being ready for printing when a page is ready to be printed.

Printable strips 420 are post-processed scan image data that are prepared by formatter 125. When all scan lines 310 of a scanning target 305 have been processed by formatter 125 and prepared for printing as printable strips 420, then the page is ready to be printed by the hardware of print engine 130. It should be noted that "page" refers to scanning target 305, and it is not limited to a sheet of paper.

Multifunction device 105 may also include one or more paper handlers 425, as illustrated in FIG. 4. Paper handlers 425, or more generally media handlers, are optional devices of printer 115 that provide for a greater array of media types and/or post-printing media manipulation. For example, paper handler 425 may support a greater range of input media options, such as colored media, non-paper media, and so forth. Also, paper handler 425 may support a greater range of output processes, such as stapling, sorting, stacking, mail boxes, and so forth. When such media handler(s) have preparation time for printing/copying, then formatter 125 (or another component) may mange them such that page readiness may be coordinated with the time used to prepare the media handler(s), as well as the time used to prepare print engine 130.

Implementations of copying acceleration may be described in the general context of electronically-executable instructions. Generally, electronically-executable instructions include routines, programs, objects, components, data structures, and the like that perform particular functions or implement particular abstract data types. Copier acceleration implementations may also be effectuated in distributed environments where functions are performed by components that are remote from each other but are connected through a communications link. Especially in such distributed environments, electronically-executable instructions may be located in both local and remote storage media, as well as in signals extant on one or more transmission media.

Figure 5:
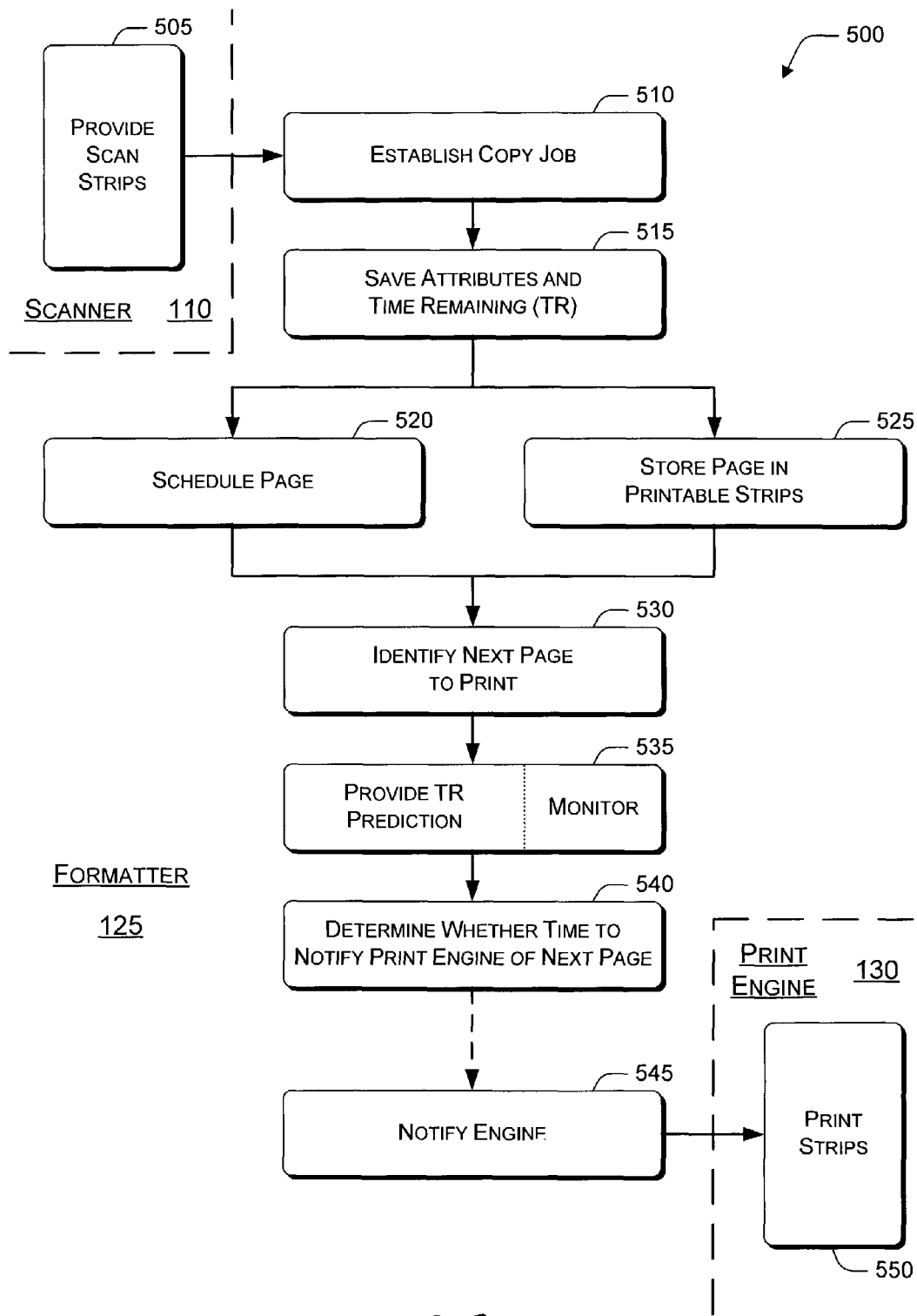
FIG. 5 is a flow diagram that illustrates an exemplary general method for accelerating copying with a multifunction device.
Figure 6:
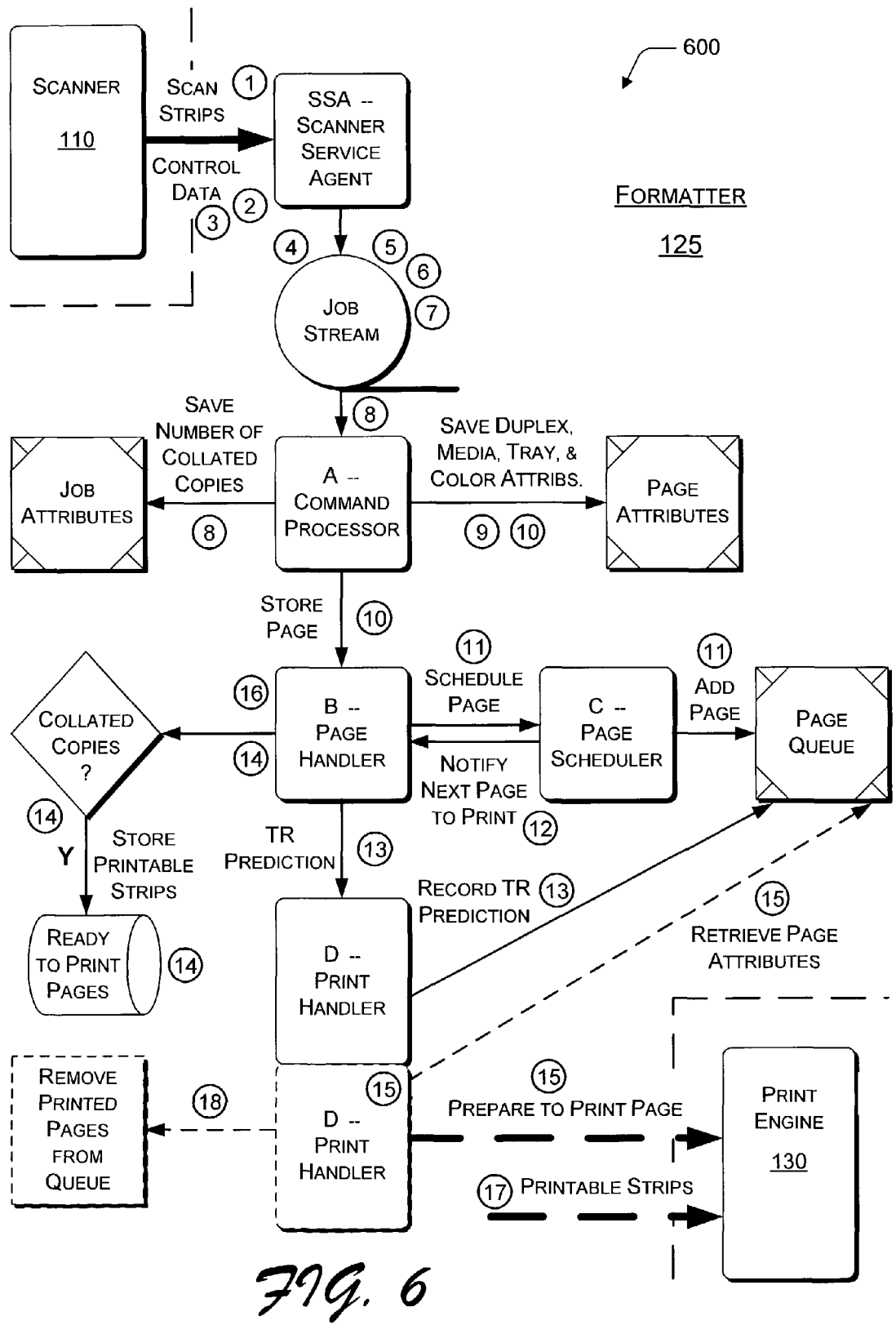
FIG. 6 is a flow diagram that illustrates an exemplary approach to accelerating copying with a multifunction device when copying a first document of a copying job.
Figure 7:
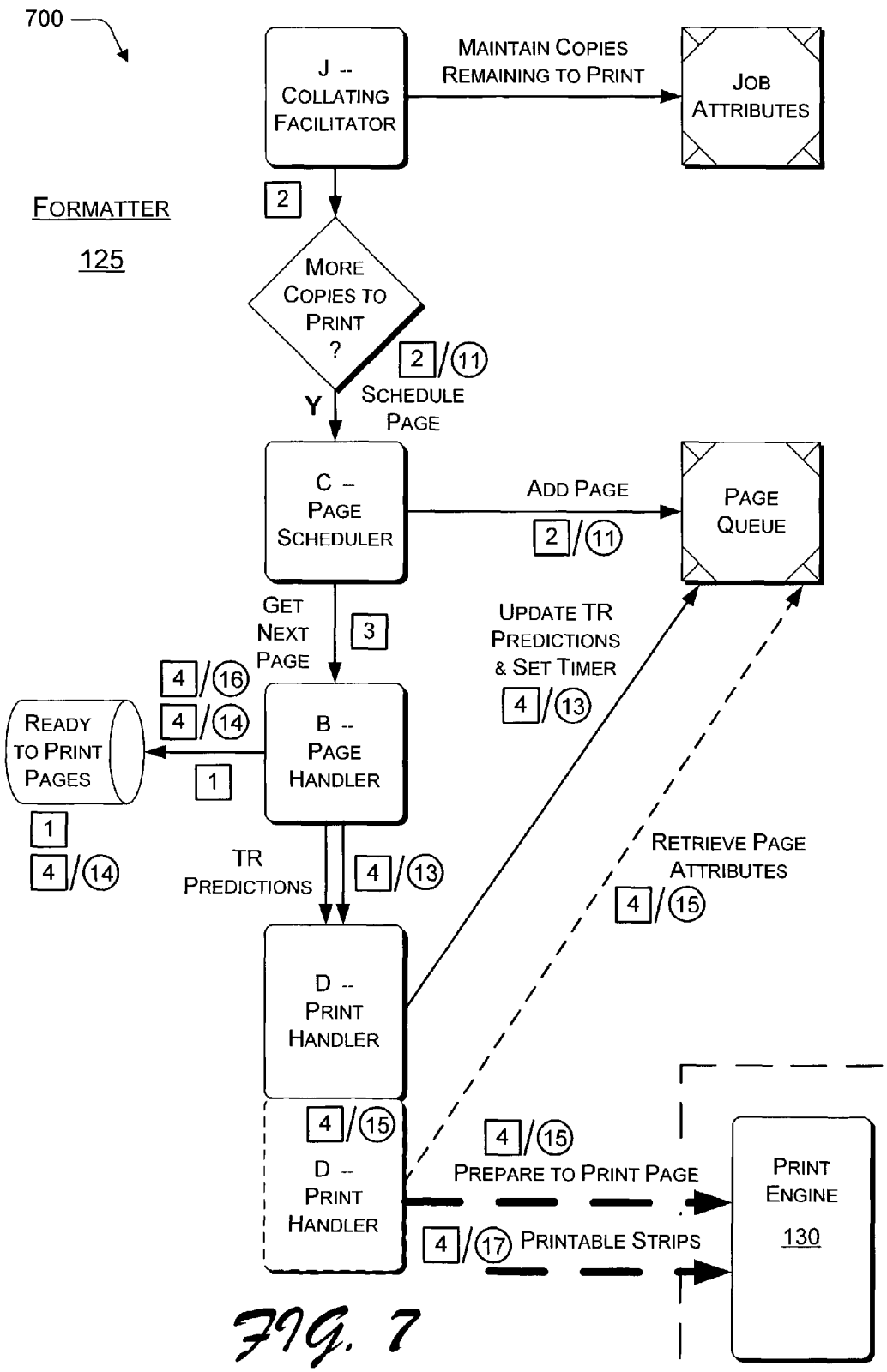
FIG. 7 is a flow diagram that illustrates an exemplary approach to accelerating copying with the multifunction device when copying a subsequent document of the copying job.

The methods, processes, and approaches of FIGS. 5-7 are illustrated in flow diagrams that are divided into multiple blocks. However, the order in which they are described is not intended to be construed as a limitation, and any number of the described blocks can be combined in any order to execute one or more methods, processes, and approaches for accelerating copying. Furthermore, although the methods, processes, and approaches of FIGS. 5-7 are described below with reference to multifunction device 105 and FIGS. 1-4 where applicable, they can be implemented in any suitable hardware, software, firmware, or combination thereof and using any appropriate printing and scanning (including copying) component(s).

FIG. 5 is a flow diagram 500 that illustrates an exemplary general method for accelerating copying with a multifunction device 105. Flow diagram 500 includes ten (10) blocks 505-550. In this exemplary method, blocks 505-550 are implemented by three components of the multifunction device 105. Specifically, a scanner 110 implements block 505, a formatter 125 implements blocks 510-545, and a print engine 130 implements block 550.

At block 505, scan strips are provided. For example, scan strips 310 of a scanning target 305 are sent from the scanner 110 to the formatter 125 as scanning information 135 in accordance with protocol 140.

At block 510, a copy job is established. For example, a copy job 405 is initialized and stored in a memory 120 of the multifunction device 105. At block 515, attributes of the copy job and a time remaining until the first/next page is ready to print are saved. For example, the formatter 125 stores attributes 410 and time remaining 415 in association with the copy job 405 at the memory 120.

At block 520, a page is scheduled. For example, the formatter 125 schedules a page for which scan strips are incoming on a queue for printing. At block 525, printable strips for the page are stored. For example, printable strips 420 may be saved in association with the copy job 405 at the memory 120 by the formatter 125. The printable strips 420 are capable of being directly printed by the print engine 130. The scan strips 310, if not themselves capable of being directly printed by the print engine 130, are processed into bit-level printable strips 420 by the formatter 125. The actions of block 525 may occur before, after, or fully or partially during the actions of block 520. In a described implementation, however, only a few printable strips 420, if any, are stored prior to scheduling the page.

At block 530, the next page to print is identified. For example, the first page of a copy job or the next page on a queue of pages to be printed is identified. At block 535, a time remaining prediction is provided for this next page, and the time remaining is monitored. For example, the time remaining may be monitored by setting a timer that counts down the time period of the time remaining prediction, by noting a current time in order to make subsequent comparisons of the time period of the time remaining prediction to a difference between the current time and an updated current time, and so forth.

At block 540, whether or not it is time to notify the print engine of the next page is determined. This determination is made by making one or more analyses with respect to the time remaining until the next page is ready to print, a current state of the print engine 130, timings of the print engine 130, one or more job-level and/or page-level attributes of the copy job, the position of the copy job on a job stream, the position of the page on a page queue, some combination thereof, and so forth. Exemplary implementations of a job stream and a page queue are described further below with reference to FIGS. 6 and 7.

Examples of job-level attributes include total number of pages (if available), number of collated copies, and so forth. Examples of page-level attributes include duplex/simplex, media type (including a size thereof), media handling (including input tray source, output slot or tray destination, special features, etc.), color requirements, and so forth. Other attributes may also be specified.

Examples of print engine timings include those time periods consumed by the print engine when switching between or among different print engine states. Print engine states include (i) sitting idle or being inactive, (ii) being ready to print or spinning, (iii) terminating-a-ready-condition or spinning down, and so forth. For instance, a print engine timing may refer to the time consumed when print engine 130 spins up or readies for printing from a previously idle state. As an example, it may be determined to be time to notify print engine 130 so that print engine 130 may begin spinning up when print engine 130 is currently inactive and the monitored time remaining (from the time remaining prediction) for the next page is or drops below a print engine timing period for spinning up from such an inactive state. Consequently, print engine 130 may be ready for printing when the page is ready and fully processed without print engine 130 being in a ready condition unnecessarily.

At block 545, when the above analysis of block 540 determines that it is time to notify the print engine, the print engine is notified to begin preparing for printing. It should be noted that the dashed flow arrow between blocks 540 and 545 indicates that the actions of block 545 may be effectuated asynchronously with respect to the actions of blocks 510-540. The notification (of block 545) may be sent from the formatter 125 to the print engine 130 as part of printing information 145. Also, in implementations with paper/media handlers, one or more of the media handlers may be similarly notified that it is time to begin preparations for media handling.

In response to the notification, the print engine 130 begins to prepare for printing. As a result, the print engine 130 reaches a ready state at approximately the same time as the printable strips 420 for the entirety of the next page are ready. These printable strips 420 are provided to the print engine 130 from the formatter 125 as part of the printing information 145. They may be provided by transmitting the printable strips 420 from the formatter 125 to the print engine 130, by enabling the print engine 130 to access the memory 120 and retrieve the printable strips 420 from the copy job 405, and so forth. At block 550, the strips are printed. For example, the print engine 130 renders the image data of the printable strips 420 on some physical media.

FIG. 6 is a flow diagram 600 that illustrates an exemplary approach to accelerating copying with a multifunction device 105 when copying a first document of a copying job. Flow diagram 600 shows multiple components of multifunction device 105, including scanner 110, print engine 130, and formatter 125. Formatter 125 is also illustrated as having multiple components. The encircled numerals (1) through (18) indicate and facilitate reference to specific aspects of the described mechanism.

These multiple components of formatter 125 include executable-type components, data structure-type components, mass memory storage-type components, data flow-type components, and so forth. Each of these components is described further below. The executable-type components include first, second, third, fourth, and fifth components labeled SSA, A, B, C, and D, respectively. The data structure-type components include the job stream, the job attributes, the page attributes, and the page queue. The mass memory storage-type components include those that store the ready-to-print pages. The data flow-type components include the job stream and the collated copies function. Any of these components may be implemented as hardware, software, firmware, some combination thereof, and so forth.

At (1), scanner 110 communicates with a first executable-type component that is called a Scanner Service Agent (SSA). The SSA understands the protocol for passing information between scanner 110 and printer 115. The SSA is also capable of creating a "hardware ready bits" job stream of page control data and printable image strips for print engine 130.

Before sending scanned image data for a copying job at (1), scanner 110 passes to the SSA the job control data for a copying job at (2). Job control data may include the number of collated copies and other such job-level attributes. Also, before sending scanned image data for a page, scanner 110 passes to the SSA page control data at (3). Page control data may include media type, media size, whether or not the page is duplexed (duplex indicator), optionally the source and destination media trays (tray indicator(s)), and so forth. Scanner 110 may additionally send whether or not the page has color (color indicator) at this time or with the first scan strip of image data.

At (4), the SSA creates a job stream by inserting a Begin Job command to establish job attributes, such as the number of collated copies. At (5), the SSA adds a page to the job stream by inserting a Begin Page command with the page control data. If scanner 110 has not and does not specify source and destination trays, then printer 115 (e.g., formatter 125) may determine these attributes from other attributes that are specified in the job stream along with known configuration information for the media trays of printer 115.

At (6), before the first scan image strip in the job stream, the SSA inserts a Time Remaining command that specifies the time remaining prediction for the page, the estimated compressed size of the printable image strips, and whether or not the page contains color (the color indicator). The compressed size estimate allows for pre-allocation of memory for the image data. At (7), the SSA inserts a Close Page command in the job stream after the page image data.

At (8), a second executable-type component that is called a Command Processor (and designated component A) receives the job stream and saves the job attributes in volatile memory. These job attributes may include the number of collated copies. At (9), as part of processing the Begin Page command, component A saves in volatile memory the page attributes. These page attributes may include the duplex policy, the media type, the media size, the tray source and destinations (if specified), and so forth. These are usually needed in order to prepare the print engine for printing a page.

At (10), when component A processes the Time Remaining command in the job stream, component A saves the page color attribute, which is also usually needed to prepare the print engine for printing the page. Component A additionally enqueues the address of the memory location. Component A is also responsible for invoking a third executable-type component that is called a Page Handler (and designated component B). Component B is invoked to begin the process of storing in volatile memory the printable image strips, which will be used to print the page.

At (11), component B (possibly immediately) invokes a fourth executable-type component that is called a Page Scheduler (and designated component C). Component C is invoked to schedule the page for printing (e.g. in the page queue), although scanning of the page and storing of the printable image strips has just started. Component C enqueues the memory locations for printing, taking care to batch and enqueue duplex pages in the correct order in the page queue for the print engine duplexer. At (12), component C communicates to component B whether or not the page it has scheduled is the next page to print on the print engine.

At (13), if the page is the next page to print, component B sends the time remaining prediction to a fifth executable-type component that is called a Print Handler (and designated component D). Component D causes the print engine to prepare for printing. The time remaining prediction should be relatively accurate because expected page scan time is known once the scanning starts. Component D records the time remaining prediction at the memory location for the page in the page queue. Component D also sets a timer or records the current time in order to track elapsed time with respect to the recorded time remaining prediction.

At (14), component B identifies the page by memory location as enqueued by component C. If the copy job includes collated copies, then component B also saves the printable image strips to non-volatile memory. This non-volatile memory may be a permanent inexpensive storage such as a hard drive.

Meanwhile, asynchronous aspects of flow diagram 600 are also occurring. These asynchronous aspects are indicated by dashed lines. At (15), an asynchronous part of component D examines the page queue. Component D determines whether or not to notify print engine 130 of another page in the page queue based on a number of factors. These factors include one or more print engine characteristics, the time remaining prediction for a page or time remaining predictions for multiple pages, the elapsed time(s) since the prediction(s) were recorded, and so forth. Print engine characteristic(s) may include the state of the print engine (e.g., idle, still printing, just finishing printing, etc.), the timings of the print engine, both of these, and so forth.

When component D notifies print engine 130, component D establishes the attributes of the page to be printed. If the page is the first page of a duplex batch, then component D notifies print engine 130 of the entire duplex batch. Notifying print engine 130 causes print engine 130 to begin preparing for printing, if print engine 130 is not already in a ready state at that time.

At (16), while print engine 130 becomes ready for printing and/or finishes printing a previous page, component B finishes receiving the next page's printable strips. At (17), when print engine 130 is ready to receive the next page, component D invokes component B to write the printable image strips for this next page. Component B or component D can provide the printable image strips for this page to print engine 130. At (18), component D also removes the printed pages from the page queue. This removal can occur page-by-page or at the end of each copy job.

FIG. 7 is a flow diagram 700 that illustrates an exemplary approach to accelerating copying with multifunction device 105 when copying a subsequent document of the copying job. Flow diagram 700 shows many of the same components as flow diagram 600 (of FIG. 6). However, flow diagram 700 does omit some components to improve clarity, such as scanner 110, components SSA and A, and so forth. The encircled numerals (11) and (13) through (17) are included again.

Flow diagram 700 adds a sixth executable-type component labeled J and a data flow-type component that addresses the number of copies to be printed. The numerals [1] through [4] that are each enclosed by a square indicate and facilitate reference to specific aspects of the collating mechanism that are newly described below.

Flow diagram 700 illustrates a mechanism for handling multiple collated copies of a scan and print, or copy, job. At [1], component B stores the printable image strips to the non-volatile memory. It may be the same non-volatile memory as is referenced in FIG. 6 or it may be a separate memory. At [2], the sixth executable-type component that is called a Collating Facilitator (and designated component J) invokes component C. Component C is invoked by component J to schedule each page of a collated copy job, similarly to aspect (11) of FIG. 6.

At [3], after enqueuing page memory locations as in aspect (11), component C invokes component B to read the next page's printable image strips from permanent (e.g., non-volatile) storage. At [4], aspects (13) through (17) of FIG. 6 are repeated for the page being printed. It should be understood that when printing collated copies and/or other pages that are stored on slower media, the time remaining prediction(s) represent the expected time to read the page's printable image strips from the non-volatile storage, instead of the time to complete a scan of the page. Time remaining predictions in these circumstances are typically a function of the size of the data and the access rate of the non-volatile storage or other media.

Although implementation(s) of apparatuses, methods, systems, and arrangements have been illustrated in the accompanying Drawings and described in the foregoing Detailed Description, it will be understood that the present invention is not limited to the implementation(s) explicitly disclosed, but is capable of numerous rearrangements, modifications, substitutions, etc. without departing from the spirit and scope set forth and defined by the following claims.

What is claimed is:

1. A device comprising:
a scanner to scan a scanning target to produce an electronic image of the scanning target, the scanning target defined by a page of media presented to the scanner; and
a printer to print an image of the scanning target on a media, the printer including a print engine;
wherein the device is to overlap the scanning of the scanning target with preparation of the print engine for printing responsive to (i) a time remaining prediction just for the scanner to produce the electronic image of the scanning target such that the time remaining prediction does not include any time to transmit the electronic image of the scanning target from the scanner to the printer, and (ii) a timing just for the print engine to switch from an idle state to a spun-up state such that the timing does not include any timing in which the print engine actually performs printing, and wherein no printing of the image of the scanning target is performed until the scanning target has been completely scanned,
wherein the printer reaches a ready state at a same time the image is ready to be printed, the ready state indicating that the printer has finished warming up and is now able to print.

2. The device of claim 1, wherein the device further comprises:
a formatter to receive the electronic image of the scanning target from the scanner and to produce a hardware-ready image of the scanning target for the print engine.

3. The device of claim 2, wherein the formatter comprises part of the printer.

4. The device of claim 2, wherein the formatter is to manage the print engine in order to overlap the scanning of the scanning target with the preparation of the print engine for printing by switching the print engine from the idle state to the spun-up state.

5. The device of claim 1, wherein the print engine comprises a laser printer print engine.

6. The device of claim 1, wherein the device is further to overlap the scanning of the scanning target with preparation of at least one media handler for media handling responsive to the time remaining prediction for the scanner to produce the electronic image of the scanning target.

7. An electronic device that is capable of accelerating copying, the electronic device comprising:
   a scanning component to begin a scan of a scanning target to produce a plurality of scan strips that represent the scanning target, the scanning target defined by an entire scannable portion of an object presented to the scanner;
   a printing component to print an image of the scanning target on media, the printing component including a print engine; and
   one or more formatting components to manage the print engine of the printing component by notifying the print engine to begin readying for printing responsive to (i) a time remaining prediction just to acquire strips that represent the scanning target such that the rime remaining prediction does not include any time to transmit the strips from the scanning component to the printing component, and (ii) a timing just for the print engine to switch from an idle state to a spun-up state such that the timing does not include any timing in which the print engine actually performs printing,
   wherein the print engine is notified to begin readying for printing when the time remaining prediction to acquire strips that represent the scanning target is less than or equal to the timing for the print engine to switch from an idle state to a spun-up state, and
   wherein no printing of the image of the scanning target is performed until the scanning target has been completely scanned,
   wherein the print engine reaches a ready state at a same time the image is ready to be printed, the ready state indicating that the print engine has finished warming up and is now able to print.

8. The electronic device of claim 7, wherein the electronic device comprises a multifunction device to provide a plurality of functions selected from the group comprising printing, copying, scanning, faxing, and electronic transmission by other means.

9. The electronic device of claim 7, wherein the scanning target comprises a document having one or more pages.

10. The electronic device of claim 7, wherein the time remaining prediction corresponds to a time to complete the scan of the scanning target to produce all scan strips that represent an entirety of the scanning target.

11. The electronic device of claim 7, wherein the time remaining prediction corresponds to a time to retrieve from a memory printable image strips that represent an entirety of the scanning target.

12. The electronic device of claim 7, wherein the electronic device further comprises:
   at least one media handling component; and
   wherein the one or more formatting components are to manage the at least one media handling component by notifying the at least one media handling component to begin readying for media handling responsive to the time remaining prediction to acquire the strips that represent the scanning target.

13. An arrangement for accelerating copying, the arrangement comprising:
   means for scanning a physical object into an electronic form;
   means for formatting the electronic form into a printable image format; and
   means for printing the printable image format onto media;
   wherein the means for formatting includes means for managing the means for printing responsive to (i) at least one time remaining prediction just for the means for scanning to complete a scanning of the physical object into the electronic form such that the time remaining prediction does not include any time to transmit the electronic form of the physical object from the means for scanning to the means for formatting or to the means for printing, and (ii) a timing just for the means for printing to switch from an idle state to a spun-up state such that the timing does not include any timing in which the means for printing actually performs printing,
   wherein the means for printing is notified to begin readying for printing when the at least one time remaining prediction for the means for scanning to complete a scanning of the physical object into the electronic form is less than or equal to the timing for the means for printing to switch from an idle state to a spun-up state, and
   wherein no printing of the printable image is performed until the physical object has been completely scanned,
   wherein the means for printing reaches a ready state at a same time the printable image is ready to be printed, the ready state indicating that the means for printing has finished warming up and is now able to print.

14. The arrangement of claim 13, wherein the means for managing further manages the means for printing responsive to a current state of the means for printing and an elapsed time since the at least one time remaining prediction was recorded.

15. The arrangement of claim 13, wherein the means for managing further manages the means for printing responsive to at least one of a timer and a recorded current time.

16. The arrangement of claim 13, wherein the means for managing comprises a scanner service agent, a command processor, a page handler, a page scheduler, a print handler, and a collating facilitator.

17. An electronic device that is capable of accelerating copying, the electronic device comprising:
   a scanner to scan a scanning target to produce a plurality of scan strips that represent an image of the scanning target, the scanning target defined by an entire scannable portion of a page of media presented to the scanner;
   a printer to print the image of the scanning target on media, the printer including a print engine; and
   one or more components to process the plurality of scan strips that represent the image of the scanning target and to notify the print engine to begin readying for printing while at least a portion of the plurality of scan strips that represent the image of the scanning target are still being processed responsive to (i) a time remaining prediction just for the scanner to produce the plurality of scan strips that represent the image of the scanning target such that the time remaining prediction does not include any time to transmit the scan strips from the scanner to the printer, and (ii) a timing just for the print engine to switch from an idle state to a spun-up state such that the timing does not include any timing in which the print engine actually performs printing,
   wherein the one or more components further notifies the print engine to begin readying for printing when the time remaining prediction for the scanner to produce the plurality of scan strips that represent the image of the scanning target is less than or equal to the timing for the print engine to switch from an idle state to a spun-up state, and
   wherein no printing of the scanning target is performed until the scanning target has been completely scanned,
   wherein the printer reaches a ready state at a same time the scan strips are ready to be printed, the ready state indicating that the printer has finished warming up and is now able to print.

18. The electronic device of claim 17, wherein the one or more components comprise at least part of a formatter of the printer.

19. The electronic device of claim 17, wherein the one or more components comprise:
a scanner service agent component to receive the plurality of scan strips that represent the image of the scanning target and to convert the plurality of scan strips into a plurality of hardware-ready bit-strips; the scanner service agent component to create a job for the plurality of scan strips in a job stream.

20. The electronic device of claim 17, wherein the one or more components comprise:
a command processor component to process commands of a job that is associated with the plurality of scan strips from a job stream and to save both job-level and page-level attributes of the job.

21. The electronic device of claim 17, wherein the one or more components comprise:
a page handler component to request that a page from the plurality of scan strips that represent the image of the scanning target be scheduled for printing; to save a plurality of hardware-ready bit-strips, which are derived from the plurality of scan strips, to non-volatile memory; and to provide the time remaining prediction for the page.

22. The electronic device of claim 17, wherein the one or more components comprise:
a page scheduler component to add a page formed from the plurality of scan strips that represent the image of the scanning target to a page queue and to provide a notification when the page is the next page to be printed off of the page queue.

23. The electronic device of claim 17, wherein the one or more components comprise:
a print handler component to receive the time remaining prediction, which is associated with a page formed from the plurality of scan strips that represent the image of the scanning target; to retrieve at least one page-level attribute of the page; and to notify the print engine to begin readying for printing by switching from the idle state to the spun-up state responsive to the time remaining prediction.

24. The electronic device of claim 17, wherein the one or more components comprise:
a collating facilitator component to cause multiple pages of a collating copy job, which includes the scanning target, to be scheduled on a page queue.

25. The electronic device of claim 17, wherein the one or more components are further to notify at least one media handler to begin readying for media handling while at least a portion of the plurality of scan strips that represent the image of the scanning target are still being processed responsive to the time remaining prediction for the scanner to produce the plurality of scan strips that represent the image of the scanning target.

* * * * *

UNITED STATES PATENT AND TRADEMARK OFFICE
CERTIFICATE OF CORRECTION

| | | |
|---|---|---|
| PATENT NO. | : 8,264,710 B2 | Page 1 of 1 |
| APPLICATION NO. | : 10/385401 | |
| DATED | : September 11, 2012 | |
| INVENTOR(S) | : Theresa A. Burkes et al. | |

It is certified that error appears in the above-identified patent and that said Letters Patent is hereby corrected as shown below:

In column 11, line 16, in Claim 7, delete "rime" and insert -- time --, therefor.

Signed and Sealed this
Twelfth Day of February, 2013

Teresa Stanek Rea
*Acting Director of the United States Patent and Trademark Office*